(12) United States Patent
Horiuchi et al.

(10) Patent No.: US 11,846,311 B2
(45) Date of Patent: Dec. 19, 2023

(54) EXTERNAL THREAD MEMBER

(71) Applicant: TOPURA CO., LTD., Hadano (JP)

(72) Inventors: Naoki Horiuchi, Hadano (JP); Keisuke Hibino, Hadano (JP)

(73) Assignee: TOPURA CO., LTD., Hadano (JP)

( * ) Notice: Subject to any disclaimer, the term of this patent is extended or adjusted under 35 U.S.C. 154(b) by 548 days.

(21) Appl. No.: 17/251,595

(22) PCT Filed: Jun. 12, 2019

(86) PCT No.: PCT/JP2019/023294
§ 371 (c)(1),
(2) Date: Dec. 11, 2020

(87) PCT Pub. No.: WO2019/240173
PCT Pub. Date: Dec. 19, 2019

(65) Prior Publication Data
US 2021/0254652 A1    Aug. 19, 2021

(30) Foreign Application Priority Data
Jun. 13, 2018  (JP) .................................. 2018-113078

(51) Int. Cl.
*F16B 33/02*   (2006.01)
*F16B 35/04*   (2006.01)

(52) U.S. Cl.
CPC ............ *F16B 33/02* (2013.01); *F16B 35/047* (2013.01)

(58) Field of Classification Search
CPC .. F16B 25/00; F16B 25/0057; F16B 25/0078; F16B 33/00; F16B 33/02; F16B 35/04; F16B 35/041; F16B 35/047; F16B 35/065
(Continued)

(56) References Cited

U.S. PATENT DOCUMENTS 6,077,013 A    6/2000  Yamamoto et al.
6,089,806 A *  7/2000  Reynolds ............ F16B 25/0021
                                                          411/416

(Continued)

FOREIGN PATENT DOCUMENTS

JP    H08-159131 A    6/1996
JP    2000-018226 A   1/2000
(Continued)

OTHER PUBLICATIONS

Extended European Search Report dated Jan. 26, 2022 (corresponding to EP 19818928.4).

*Primary Examiner* — Roberta S Delisle
(74) *Attorney, Agent, or Firm* — Harness, Dickey & Pierce, P.L.C.

(57) ABSTRACT

An external thread member capable of preventing oblique entry or insertion by a short screw tip shape is provided including, in its shank portion (20), a normal thread area (22), a guide thread area (24) provided at a tip side of the shank portion with respect to the normal thread area (22) and in which a guide screw thread (23) is formed, and a rising area (26) in which a transition screw thread (25) gradually rising from the guide screw thread (23) to the complete screw thread (21) is formed. A tapered guide portion (30) is provided at a tip end side of the normal thread area (22) and includes at least the guide thread area (24). The guide screw thread (23) is formed on an outer periphery of the tapered guide portion (30) which has a maximum diameter equal to or smaller than an inner diameter of an internal thread.

18 Claims, 7 Drawing Sheets

(58) Field of Classification Search
USPC .......................................... 411/411, 424, 426
See application file for complete search history.

(56) References Cited

U.S. PATENT DOCUMENTS

| | | | |
|---|---|---|---|
| 6,120,227 | A | 9/2000 | Murase et al. |
| 6,155,761 | A | 12/2000 | Donovan |
| 7,214,020 | B2 * | 5/2007 | Suzuki ................ F16B 25/0021 411/417 |
| 7,959,393 | B2 * | 6/2011 | Ambros .............. F16B 25/0021 411/386 |
| 2004/0208726 | A1 * | 10/2004 | Bohme ................... F16B 33/06 411/914 |
| 2015/0023761 | A1 * | 1/2015 | Pritchard ............ F16B 25/0021 411/411 |
| 2015/0316089 | A1 * | 11/2015 | Pritchard ................ F16B 33/02 411/366.3 |
| 2021/0108664 | A1 * | 4/2021 | Hebert .................... F16B 39/30 |
| 2021/0231157 | A1 * | 7/2021 | Sugiyama ........... F16B 25/0057 |
| 2021/0310510 | A1 * | 10/2021 | Hebert ................ F16B 25/0057 |
| 2021/0396261 | A1 * | 12/2021 | Vik ........................ F16B 33/02 |

FOREIGN PATENT DOCUMENTS

| | | |
|---|---|---|
| JP | 2000-329125 A | 11/2000 |
| JP | 3739012 B2 | 1/2006 |
| JP | 2016-180494 A | 10/2016 |
| TW | 201314061 A | 4/2013 |

* cited by examiner

EXTERNAL THREAD MEMBER

CROSS-REFERENCE TO RELATED APPLICATIONS

This application is a National Stage of International Application No. PCT/JP2019/023294, filed Jun. 12, 2019 (now WO 2019/240173A1), which claims priority to Japanese Application No. 2018-113078, filed Jun. 13, 2018. The entire disclosures of each of the above applications are incorporated herein by reference.

FIELD

The present disclosure relates to an external thread member having a screw tip shape that prevents skew meshing or oblique entry into an internal screw. Here, the term "oblique entry" refers to a state in which an external screw obliquely enters an internal screw at a relative angle thereto, and bites into the internal screw, resulting in seizure or galling.

BACKGROUND

Conventionally, in mass production processing such as assembly of automobiles or the like, tightening devices capable of performing tightening at high-speed rotation are used as tightening devices in order to improve workability when tightening screws. Depending on tightening parts, a working posture may be unstable, and hence, tightening may not be carried out with an external screw on the same line with respect to a mating internal screw. Galling and seizure may occur between the external screw and the internal screw due to work under adverse conditions where tightening may be performed at high speed and obliquely.

As a countermeasure for these problems, there has been proposed, for example, a bolt with a pilot as described in Patent Literature 1. This bolt with a pilot has a configuration in which a screw tip shape of a tip end of a shank portion is such that a guide screw thread with a diameter smaller than that of a complete screw thread is provided at a tip side of the shank portion on which the complete screw thread is formed, and a cylindrical guide is provided on a further tip side from the guide screw thread. The guide screw thread is configured to have an outer diameter equal to or smaller than an inner diameter of an internal screw, and the cylindrical guide (i.e., a guide having a cylindrical outer peripheral surface) is configured to have a diameter that is larger than a root diameter of the guide screw thread and equal to or smaller than the outer diameter of the guide screw thread. When threadedly engaged with and fastened to the internal screw, the bolt with a pilot is inserted therein while its inclination is corrected by the cylindrical guide at the tip end thereof, and the guide screw thread is subsequently inserted into and engaged with the internal screw thread of the internal thread member, so that it is guided to be threadedly engaged with the complete screw thread while the pitch is adjusted.

CITATION LIST

Patent Literature

Patent Literature 1: Japanese Patent No. 3739012

SUMMARY

Technical Problem

However, in the bolt with a pilot of Patent Literature 1, the guide screw thread and the cylindrical guide extend to the tip of the shank portion on which the complete screw thread is formed, so that the length of the threads themselves increases and the weight thereof also increases. In addition, if the length of the internal screw is short, the cylindrical guide cannot sufficiently correct the inclination, and it is not possible to prevent seizure or galling.

An object of the present disclosure is to provide an external thread member capable of preventing oblique entry or insertion by means of a short screw tip shape.

Solution to Problem

In order to achieve the above object, the present disclosure provides an external thread member including, in a shank portion, a normal thread area in which a complete screw thread to be fastened to an internal thread member is formed, a guide thread area provided at a tip side of the shank portion with respect to the normal thread area and in which a guide screw thread having a diameter smaller than that of the complete screw thread and having a same pitch is formed, and a rising area in which a transition screw thread gradually rising from the guide screw thread to the complete screw thread is formed, characterized in that a tapered guide portion with a diameter gradually decreasing toward a tip end of the shank portion is provided at a tip end side of the normal thread area of the shank portion, the tapered guide portion including at least the guide thread area, the guide screw thread being formed on an outer periphery of the tapered guide portion; and the tapered guide portion has a maximum diameter equal to or smaller than an inner diameter of an internal screw and equal to or larger than a root diameter of the complete screw thread.

In a tightening operation with respect to a threaded hole of the internal thread member, first, the tapered guide portion enters the threaded hole of the internal thread member at its opening end by a predetermined amount. When the shank portion of the external thread member enters at an angle with respect to the central axis of the threaded hole, the transition screw thread or the complete screw thread engages with the screw thread of the internal screw located at the opening end of the threaded hole. In this state, even in cases where the guide screw thread located at a 180 degrees opposite position is misaligned and engaged with the screw thread of the internal screw, for example, with a shift by one thread ridge (biting state), the diameter of the tapered guide portion increases with rotation, and the guide screw thread at the biting position is naturally disengaged from the screw thread of the internal screw, so that the inclination of the shank portion is being corrected by a moment acting thereon with an engagement portion of the transition screw thread or the complete screw thread as a fulcrum, whereby the transition to a normal engagement state is being made. In addition, in cases where the rising portion or the complete screw thread is in a position engaged with the screw thread of the internal screw located at the opening end of the threaded hole, and where the guide screw thread located at the 180 degrees opposite position is not engaged with the screw thread of the internal screw, the tapered guide portion is engaged with the screw thread of the internal screw, so that the tapered guide portion is idling until the guide screw thread comes into engagement, and the inclination of the shank portion is being corrected by the moment acting thereon with the engagement portion of the transition screw thread or the complete screw thread as a fulcrum. After that, for example, even in cases where the guide screw thread is shifted by one thread ridge from and engaged with the internal screw thread, the diameter of the tapered guide portion is being increased with the rotation of the tapered guide portion, so that the guide screw thread at the biting position is naturally disengaged from the screw thread of the internal screw, and the screw threads are fitted and engaged with each other, while performing pitch adjustment. Accordingly, only by rotating the shank portion in a screwing direction, the complete screw thread is normally engaged with the screw thread of the internal screw, thus making it possible to prevent the galling and seizure of the screw threads. In this way, with the provision of the guide screw thread on the peripheral surface of the tapered guide portion provided at the screw tip, even if the shank portion enters obliquely, the galling and seizure of the screw threads can be prevented, and further, the moment for correcting the inclination of the shank portion acts, so that a conventional cylindrical guide is not required, and the length of the screw tip can be shortened as much as possible. In JIS B 1003 "Fastening Parts—Screw Tips of Externally Threaded Parts with Metric Thread", the length u of an incomplete thread portion of a screw tip is defined as 2 pitches or less (u≤2P). The inventors of the present disclosure have studied the prevention of oblique entry or insertion in the range of the length of the incomplete thread portion, and have reached the present disclosure. According to the present disclosure, a galling prevention function can be realized within the range of the length of the incomplete thread portion in the above JIS standard. However, the present disclosure is not limited to two pitches or less.

A cylindrical surface having the same diameter as a root diameter of the normal thread area is provided between the tapered guide portion and the normal thread area, and at least a part of the transition screw thread is formed on the cylindrical surface. The cylindrical surface is smaller in diameter than a maximum diameter portion of the tapered guide portion, and hence, when the tapered guide portion is obliquely inserted into the threaded hole of the internal thread member, interference thereof with the screw thread of the internal screw at the opening of the threaded hole is reduced, and the tolerance of the inclination is increased accordingly. In addition, in cases where the transition screw thread is obliquely fitted into the screw thread of the internal screw thereby to form abnormal engagement, a large force will be locally exerted on a contact portion of the transition screw thread with the screw thread of the internal screw, so that the transition screw thread, which is an imperfect thread, may be deformed and, in some cases, broken, leading to galling or seizure. However, the cylindrical surface has the same diameter as the root diameter in the normal thread area, and hence, even when the transition screw thread is deformed or broken to some extent, the transition screw thread can be screwed into the internal screw without difficulty due to a gap between the transition screw thread and the internal screw. In cases where the tapered guide portion extends to the rising area of the transition screw thread, the guide screw thread and the transition screw thread are formed on an outer peripheral surface of the tapered guide portion. The tolerance of the inclination becomes smaller in comparison with the case where there is the cylindrical surface, but the tapered guide portion extends to the rising area of the transition screw thread, which provides an advantage that a backlash upon insertion of the tapered guide portion can be reduced as much as possible. In addition, even when the screw thread of the internal screw is obliquely fitted into the screw thread of the external screw thereby to cause abnormal engagement, the height of the transition screw thread becomes low, so that a moment acting on the root portion of the transition screw thread is small, and the root portion of the transition screw thread can be reinforced by the tapered guide portion, thus making it possible to further prevent galling and seizure due to breakage of the screw thread.

In addition, the diameter of the guide screw thread can be set to be equal to or smaller than the inner diameter of the internal screw. The transition screw thread can be configured to rise from the guide screw thread to the complete screw thread with ¼-¾ circumference. The pitch can be adjusted by the guide screw thread while releasing or disengaging the guide screw thread in the biting state by means of the tapered guide portion, so that the complete screw thread and the internal screw can be fitted and engaged with each other. Also, by shortening the rising range of the transition screw thread to the ¼-¾ circumference, the occurrence of galling can be reduced. Moreover, the tapered guide portion may be provided with a chamfered portion in a tip end corner portion thereof at its small diameter side. The chamfered portion may be in a tapered shape, or may be in a rounded shape. With such a configuration, the chamfered portion performs a hole finding function, so that a misalignment between the shank portion and the central axis of the internal screw can be eliminated. An axial length of the screw from a tip position of the complete screw thread to a tip position of the tapered guide portion is set to be within two pitches of the complete screw thread. As described above, it is set within the range of a length u of an incomplete thread portion at a screw tip, as defined in JIS B 1003 "Fastening Parts—Screw Tips of Externally Threaded Parts with Metric Thread". In addition, the maximum diameter of the tapered guide portion is in the range of a lower limit value of the inner diameter of the internal screw×(90%-100%). In this way, when the maximum diameter of the tapered guide portion is set to 90% or more of the inner diameter lower limit value, in the maximum diameter portion of the tapered guide portion, the backlash thereof with respect to the threaded hole of the internal screw becomes as small as possible, so that the inclination of the tapered guide portion upon entry or insertion thereof can be regulated within a certain angle range.

Advantageous Effects of the Disclosure

According to the present disclosure, even when the screw tip shape portion is short, it is possible to effectively prevent oblique entry or insertion of the shank portion, thereby making it possible to prevent galling and seizure of the screw thread.

DRAWINGS

Figure 1:
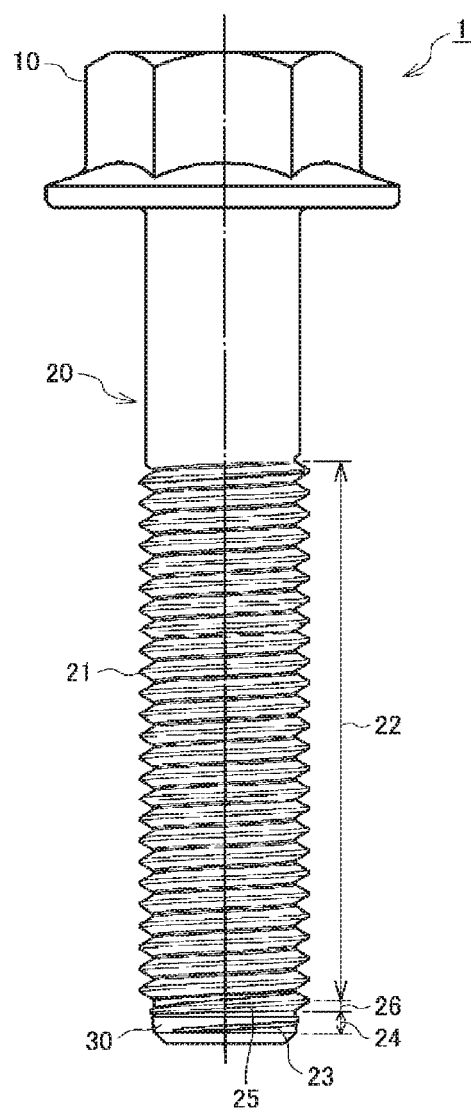
FIG. 1 is an overall view of an external thread member according to a first embodiment of the present disclosure.

FIG. 3(A) through (D) are views of a shank portion of the external thread member of FIG. 1 as seen from different phases in the direction of rotation.

FIG. 4(A) through (E) are views schematically illustrating a process of correcting an oblique insertion of the external thread member in FIG. 1, and FIG. 4(F) through (J) are views schematically illustrating a process of correcting an oblique insertion in a state of the external thread member inclined to the opposite side from FIG. 4(A).

Figure 5:
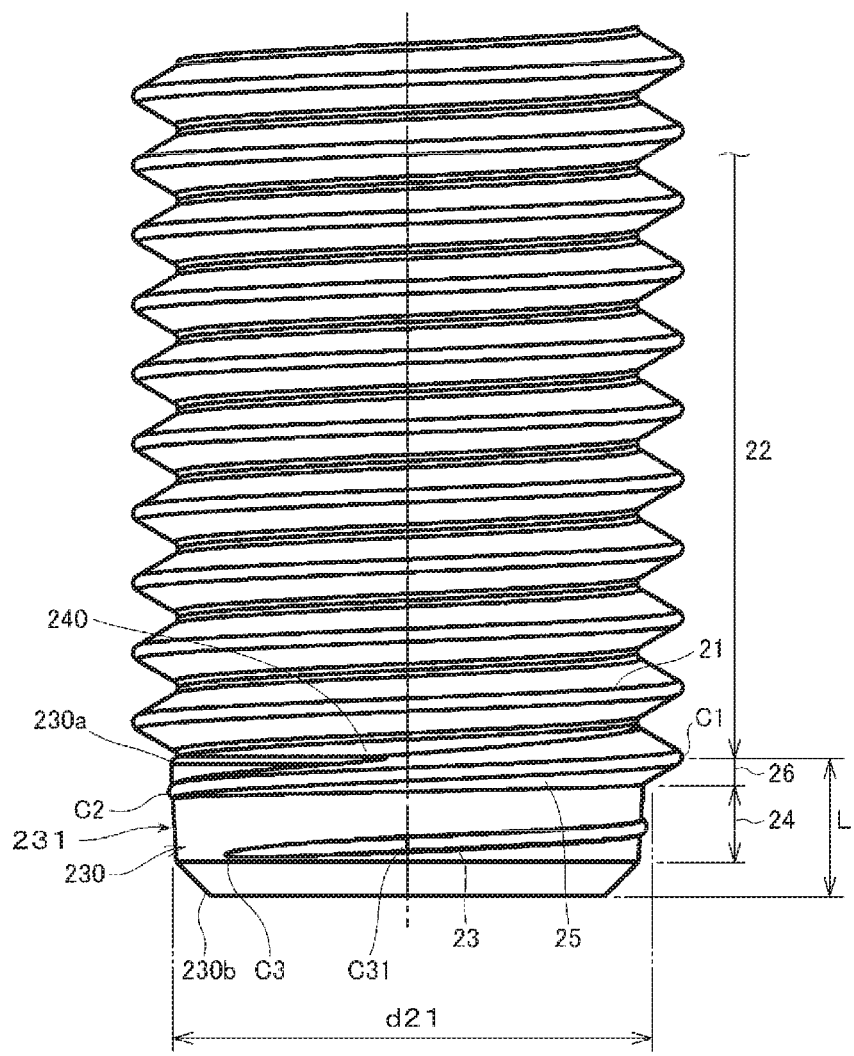

FIG. 5 is an enlarged view of main parts of an external thread member according to a second embodiment of the present disclosure.

FIG. 6(A) through (D) are views of a shank portion of the external thread member of FIG. 5 as seen from different phases in the direction of rotation.

FIG. 7(A) through (E) are views schematically illustrating a process of correcting an oblique insertion of the external thread member in FIG. 5, and FIG. 7(F) through (J) are views schematically illustrating a process of correcting an oblique insertion in a state of the external thread member inclined to the opposite side from FIG. 7(A).

DETAILED DESCRIPTION

Hereinafter, the present disclosure will be described in detail based on embodiments illustrated in the drawings.

Embodiment 1

FIG. 1 shows an external thread member according to an embodiment of the present disclosure. In this figure, 1 denotes the external thread member as a whole, and this external thread member 1 is provided with a head portion 10 and a shank portion 20, wherein the shank portion 20 has a normal thread area 22 in which a complete screw thread 21 to be fastened to an internal thread member is formed, a guide thread area 24 which is provided at a tip end side of the shank portion with respect to the normal thread area 22 and in which a guide screw thread 23 having a diameter smaller than that of the complete screw thread 21 and having a same pitch is formed, and a rising area 26 in which a transition screw thread 25 gradually rising from the guide screw thread 23 to the complete screw thread 21 is formed. Then, a tapered guide portion 30 gradually decreasing in diameter toward the tip of the shank portion 20 is provided at the tip side of the normal thread area 22 of the shank portion 20. This tapered guide portion 30 includes at least the guide thread area 24, and a guide screw thread 23 is formed on the outer periphery of the tapered guide portion 30. The shape of the head 10 is illustrated by way of example as a flanged hexagonal shape in the figure, but is not particularly limited, and various head shapes can be applied. Here, note that in the illustrated example, a pitch diameter bolt is illustrated as an example, but the present disclosure is also applicable to a nominal diameter bolt.

Figure 2:
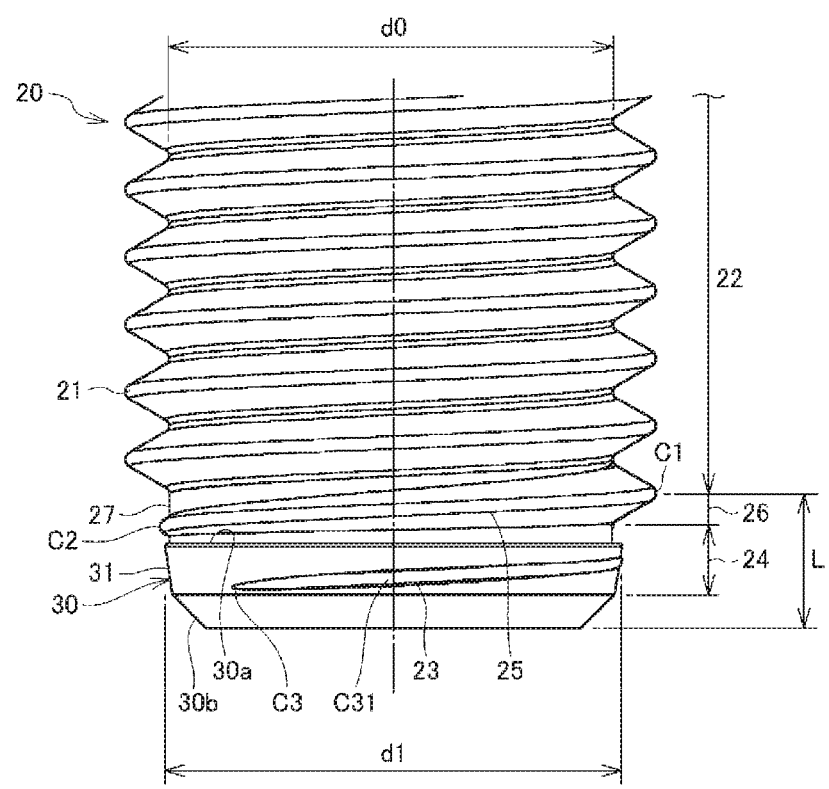
FIG. 2 is an enlarged view of main parts of the external thread member shown in FIG. 1.
Figure 3:
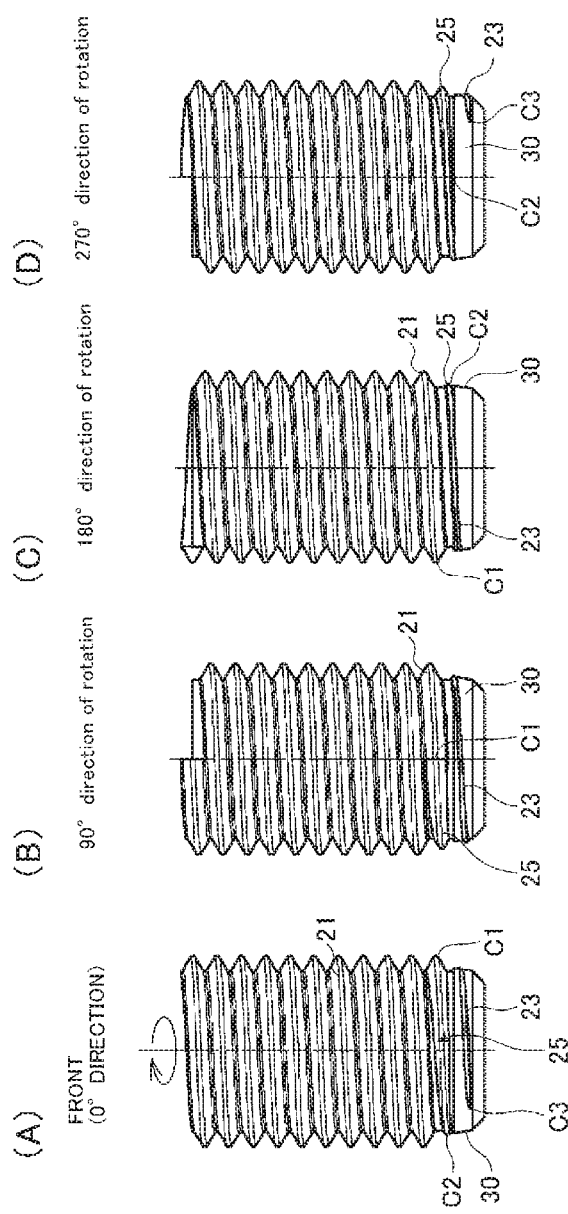

Hereinafter, the configuration of each part will be described in detail with reference to FIG. 2 and FIG. 3. FIG. 2 is an enlarged view of main portions of the shank portion of the male thread member in FIG. 1, and FIG. 3 illustrates views of the shank portion of the external thread member as seen from different phases in the direction of rotation. FIG. 3(A) through 3(D) are front views of the shank portion of the external thread member of FIG. 1 at positions rotated successively by 90 degrees in a counterclockwise direction, as indicated by an arrow in FIG. 3(A).

[Rising Area 26 of Thread]

In the rising area 26 of the thread, a cylindrical surface 27 having the same diameter as a root diameter d0 of the normal thread area 22 is provided between the tapered guide portion 30 and the normal thread area 22, and the transition screw thread 25 is formed on the cylindrical surface 27. In FIG. 3, when a connection point between the transition screw thread 25 and the complete screw thread 21 is denoted by C1, and when a connection point between the transition screw thread 25 and the guide screw thread 23 is denoted by C2, in this embodiment, as illustrated in FIGS. 3(A) and (B), the transition screw thread 25 rises from the diameter of the guide screw thread 23 to the diameter of the complete screw thread 21 in ½ rotation without changing the shape of the screw thread. The fact that the shape of the screw thread does not change means that the shape of the transition screw thread 25 has no crushed portion, flank angles on a pressure side and a clearance side are the same as those of the complete screw thread 21, and the height of the screw thread changes with the shape of its crest remaining substantially the same. However, as long as the continuity of the transition screw thread 25 with the complete screw thread 21 is maintained, a slight change in shape is acceptable. When the length of transition is extremely short, the complete screw thread 21 is engaged with the internal thread before the oblique correction is performed, so that galling is likely to occur. On the contrary, when the length of transition is too long, it leads to an increase in weight from the viewpoint of weight reduction, thus resulting in disadvantages. Therefore, it is preferable that the length of transition be configured to rise in about ¼ rotation-¾ rotation. When the length of transition is converted into an axial length with a thread pitch denoted by P, it is expressed as 0.25P-0.75P.

[Tapered Guide Portion 30]

The tapered guide portion 30 has a maximum diameter portion 30a at an end portion thereof on the side opposite to its tip end, with a step formed at a boundary with the cylindrical surface 27. On the other hand, the tapered guide portion 30 has a chamfered portion 30b formed in a tip end corner portion thereof at its small diameter side. In this embodiment, the chamfered portion 30b has a tapered shape, but may have a rounded shape. Further, the chamfered portion 30b may be omitted. The guide screw thread 23 is formed on the outer peripheral surface of a tapered portion 31 of the tapered guide portion 30 excluding the chamfered portion 30b, and constitutes the guide thread area 24. When the tip of the guide screw thread 23 is denoted by C3, the length of the guide screw thread 23 in the direction of rotation is between the tip C3 and the connection C2 thereof with the transition screw thread 25, as shown in FIGS. 3(C) and (D), and in this embodiment, it is set to be about midway between ¾ rotation (0.75P) and 1 rotation (1P). Here, note that the tip C3 of the guide screw thread 23 is the position of the outer peripheral surface of the tapered portion 31, and the guide screw thread 23 rises from the position of the tip thereof to a normal outer diameter in the direction of rotation, and when the position at which the guide screw thread 23 has risen to the normal outer diameter is defined as C31, a portion extending from C31 to the connection portion C2 thereof with the transition screw thread 25 is set to about ¾ rotation. The direction of rotation range (C2-C3) of the guide screw thread 23 is set to about a range from ½ rotation (0.5P) to 5/4 rotation (1.25P), and the taper angle of the tapered portion 31 is approximately set as follows: $0°<\theta\leq8°$. In addition, the outer diameter $\phi d1$ of the maximum diameter portion 30a is set as follows: external thread root diameter $(d0)\leq\phi d1\leq$internal thread inner diameter (minimum). Also, it is preferable that the maximum diameter portion 30a of the tapered guide portion 30 be set in the range of a lower limit value of the inner diameter of the internal screw×(90%-100%). In this way, when it is set to 90% or more of the inner diameter lower limit value, in the maximum diameter portion 30a of the tapered guide portion 30, the backlash thereof with respect to the inner diameter of the internal screw becomes as small as possible, so that the inclination of the tapered guide portion 30 upon entry or insertion thereof can be regulated within a certain angle range.

A virtual outer diameter of the guide screw thread 23 is smaller than the inner diameter of the internal screw, and is set to be equal to or larger than the maximum diameter portion 30a of the tapered guide portion 30, in order to maintain continuity with the transition screw thread 25. Since the outer diameter of the guide screw thread 23 is constant and the outer peripheral surface of the tapered portion 31 gradually increases in diameter toward the rising area 26 side, a portion protruding from the tapered portion 31 gradually becomes lower, and the protruding portion becomes the lowest at the maximum diameter portion 30a, so that the guide screw thread 23 is continuously connected to the transition screw thread 25, without changing the shape of the screw thread. The fact that the shape of the thread does not change means that the shape of the guide screw thread 23 does not have a crushed portion, the shape of the transition screw thread 25 has the same flank angle on the pressure side and the clearance side, and the shape of the crest is substantially the same, but if the continuity of the guide screw thread 23 with the transition screw thread 25 can be maintained, a slight change in the shape is allowed. When the guide screw thread 23 has the same diameter as the maximum diameter portion 30a of the tapered guide portion 30, the guide screw thread 23 becomes lower in the maximum diameter portion 30a, but the continuity of the screw thread is maintained. In this embodiment, an axial length L from the crest of the connecting portion C1 between the complete screw thread 21 and the transition screw thread 25 to the tip of the shank portion 20 is set to two pitches (2P), and the direction of rotation range of the transition screw thread 25 in the rising area, the direction of rotation range of the guide screw thread 23 in the guide thread area 24, and the axial length of the tapered guide portion 30 are set within the range of two pitches. In JIS B 1003 "Fastening Parts—Screw Tips of Externally Threaded Parts with Metric Thread", the length u of an incomplete thread portion of a screw tip is defined as 2 pitches or less (u≤2P), and hence, the present embodiment realizes a galling prevention function within the range of this JIS standard.

Figure 4:
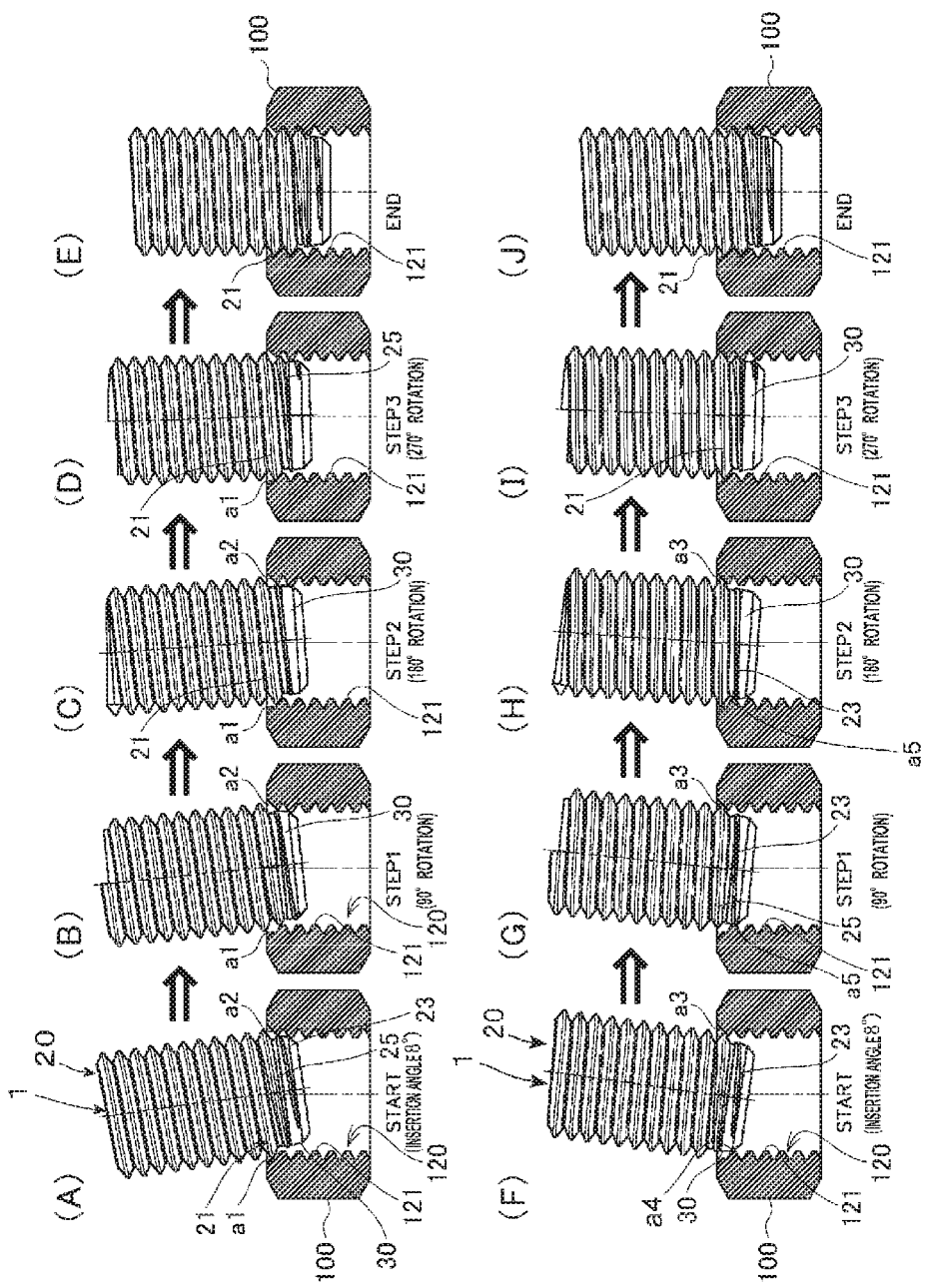

Next, a fastening operation of the external thread member of the present embodiment will be described with reference to FIG. 4. FIG. 4(A) through (E) illustrate cross sections of a state in which the shank portion 20 of the external thread member 1 enters an internal thread member 100 while being inclined in the counterclockwise direction in these figures, and FIG. 4(F) through (J) illustrate cross sections of a state in which the shank portion 20 of the external thread member 1 enters the internal thread member 100 while being inclined in the clockwise direction in these figures. First, the case where the shank portion is inclined in the counterclockwise direction will be described with reference to FIG. 4(A) through (E). FIG. 4(A) illustrates a state in which the shank portion 20 of the male thread member 1 enters the threaded hole 120 of the internal thread member 100 at an angle with respect to the center line of the threaded hole 120, so that the screw thread 121 of the threaded hole 120 is engaged with the screw thread of the external thread member 1 at the opening edge of the threaded hole 101 in an engagement portion a1, and the guide screw thread 23 at a 180 degrees opposite position a2 is engaged with the screw thread 121 of the threaded hole 120 at a position shifted by one thread with respect to the engagement portion a1, that is, engaged in a biting state. When the shank portion 20 of the external thread member 1 is rotated in this state, the diameter of the tapered guide portion 30 increases, as shown in FIGS. 4(B) and (C) (STEP 1 and STEP 2), and in STEP 3 where rotated by 270 degrees, as shown in FIG. 4(D), the guide screw thread 23 at the biting position is naturally disengaged from the screw thread 121 of the internal screw, so that the inclination of the shank portion 20 is corrected by a moment with the engagement portion a1 as a fulcrum, and the complete screw thread 21 is fastened to the screw thread 121 of the internal screw in a normally engaged state, as shown in FIG. 4(E).

Then, the case where the shank portion is inclined in the clockwise direction will be described with reference to FIG. 4(F) through (J). In FIG. 4(F), the shank portion 20 of the external thread member 1 enters at an angle with respect to the central axial line of the threaded hole 120, so that the screw thread 121 of the threaded hole 120 engages, at an engagement portion a3, with the screw thread of the external thread member 1 at the opening edge of the threaded hole 120, and abuts, at a 180 degrees opposite position a4, against the tapered guide portion 30 without the existence of the guide screw thread 23, and hence, the external thread member 1 rotates idly. On the other hand, the shank portion 20 of the external thread member 1 is rotationally driven while the inclination thereof is reduced by a counterclockwise moment with the engagement portion a3 as a fulcrum, so that when the shank portion 20 is rotated by about 90 degrees, the guide screw thread 23 is engaged with the screw thread 121 of the internal screw at an engagement portion a5 (STEP 1), as illustrated in FIG. 4(G). Then, as illustrated in FIG. 4(H), at the time of rotation by about 180 degrees, the engagement portion a5 is disengaged by the tapered guide portion 30 (STEP 2), and further, as illustrated in FIG. 4(I), at the position of rotation by about 270 degrees, a normally engaged state is attained (STEP 3), and as illustrated in FIG. 4(J), at the position of rotation by 360 degrees, the complete screw thread 21 is fastened to the screw thread 121 of the internal screw in the normally engaged state. Therefore, the complete screw thread 21 is automatically engaged with the screw thread 121 of the internal screw in a normal state only by rotating the shank portion in the screwing direction, so that the galling and seizure of the screw threads can be prevented. In this way, by providing the guide screw thread on the peripheral surface of the tapered guide portion provided at the screw tip, even if the shank portion enters obliquely, the galling and seizure of the screws can be prevented, and further, the moment for correcting the inclination of the shaft acts, so that a conventional cylindrical guide is not required, and the length of the screw tip can be made short as much as possible.

Here, note that since the cylindrical surface 27 has a smaller diameter than the maximum diameter portion 30a of the tapered guide portion 30, in cases where the tapered guide portion 30 is obliquely inserted into the threaded hole 120 of the internal thread member 100, interference thereof with the screw thread 121 of the internal screw at the opening of the threaded hole 120 is reduced, and the tolerance of the inclination is increased accordingly. In addition, in cases where the transition screw thread 25 is obliquely engaged with the screw thread 121 of the internal screw, resulting in abnormal meshing with each other, a large force is locally applied to a contact portion between the transition screw thread 25 and the screw thread 121 of the internal screw, and the transition screw thread 25, which is an incomplete screw, may be deformed and, in some cases, damaged, leading to galling and seizure. However, the cylindrical surface 27 has the same diameter as the root diameter of the normal thread area 22, and hence, even if the transition screw thread is slightly deformed or broken, there will still be a gap between the transition screw thread and the internal screw thread, allowing the transition screw thread to be screwed into the internal screw thread without difficulty.

Embodiment 2

Figure 6:
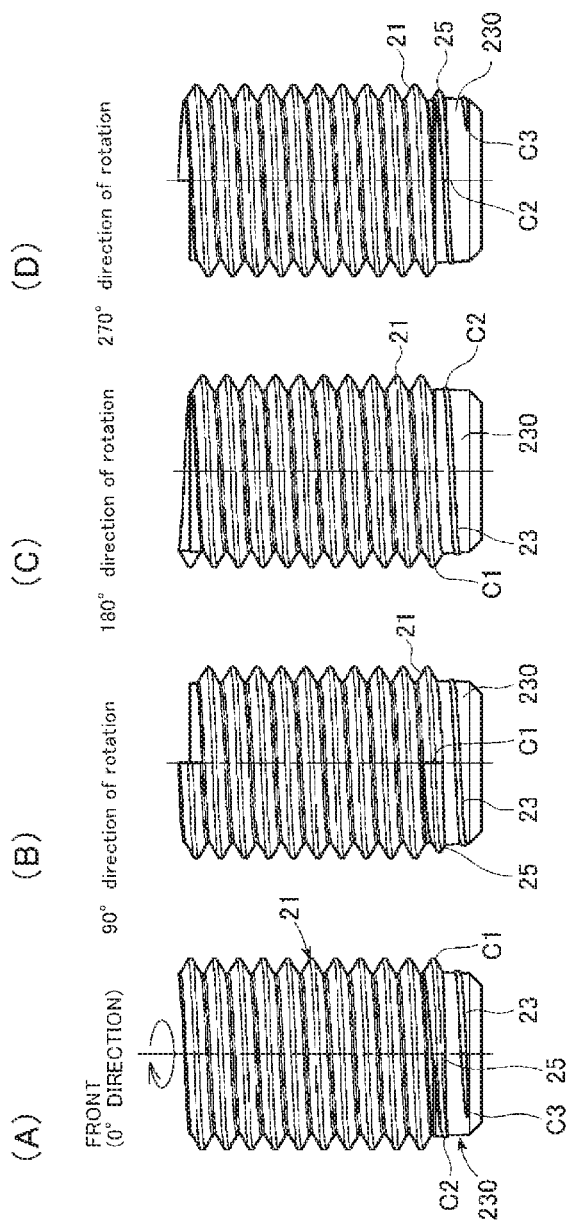

Next, a second embodiment of the present disclosure will be described. FIG. 5 is an enlarged view of main parts of the shank portion of the external thread member in this second embodiment, and FIG. 6 illustrates views of the shank portion of the external thread member as seen from different phases in the direction of rotation. FIG. 6(A) through (D) are front views of the shank portion of the external thread member of FIG. 5 at positions rotated successively by 90 degrees in the counterclockwise direction, as indicated by an arrow in FIG. 6(A). In the following description, differences from the first embodiment will be mainly described, and the same components will be denoted by the same reference numerals and characters, while the description thereof will be omitted. In this second embodiment, there is no cylindrical surface, a tapered guide portion 230 extends to the rising area 26 of the transition screw thread 25, and both the guide screw thread 23 and the transition screw thread 25 are formed on the outer peripheral surface of the tapered guide portion 230. The tapered guide portion 230, as in the above-mentioned first embodiment, has a maximum diameter portion 230a formed at its end opposite to its tip end, and a chamfered portion 230b formed in a tip end corner thereof at a smaller diameter side, wherein the guiding screw thread 23 and the transition screw thread 25 are provided on the outer surface of a tapered portion 231, except for the chamfered portion 230b of the tapered guide portion 230. The rising range of the transition screw thread 25 is, in this embodiment, ½ rotation (0.5P) (see FIGS. 6(A) and (B)), wherein the axial position of the maximum diameter portion 230a is located between the connecting portion C1 thereof with the complete screw thread 21 and the connecting portion C2 thereof with the guide screw thread 23, and a valley portion 240, which is a part of a cylindrical surface having the same diameter as the root diameter of the normal thread area 22, is formed between the flank surface on the complete screw thread side of the transition screw thread 25 and the flank surface of the adjacent complete screw thread 21. A preferred transition range of the transition screw thread 25 is about ¼ rotation (0.25P)-¾ rotation (0.75P), and the taper angle of the tapered portion 231 of the tapered guide portion 230 is about 0°<θ≤8°. In addition, the outer diameter φd21 of the maximum diameter portion 230a of the tapered guide portion 230 is set as follows: external thread root diameter (d0)≤φd21 internal thread inner diameter (minimum). Also, it is preferable that the maximum diameter portion 230a of the tapered guide portion 230 be set in the range of a lower limit value of the inner diameter of the internal screw×(90%-100%). In this way, when it is set to 90% or more of the inner diameter lower limit value, in the maximum diameter portion 230a of the tapered guide portion 230, the backlash thereof with respect to the inner diameter of the internal or internal screw becomes as small as possible, so that the inclination of the tapered guide portion 230 upon entry or insertion thereof can be regulated within a certain angle range.

Here, the portion in which the maximum diameter portion 230a appears is a portion facing the above-described valley 240, which, in an illustrated example, is less than 180 degrees, but in FIG. 5, the distance between the position of the maximum diameter portion 230a at the left end of the figure and an axially symmetrical position with respect to the center line of the shaft portion 20 is drawn as the maximum diameter. On the other hand, as illustrated in FIGS. 6(C) and (D), the guide screw thread 23 has a length in the direction of rotation from the tip C3 to the connecting portion C2 thereof with the transition screw thread, which is set to about midway between ¾ rotation (0.75P) and 1 rotation (1P). A preferable range of this guide screw thread 23 is about ½ rotation (0.5P) to 5/4 rotation (1.25P), as in the first embodiment. In this second embodiment as well, the axial length L from the crest of the connecting portion C1 between the complete screw thread 21 and the transition screw thread 25 to the tip end of the shank portion 20 is set to two pitches (2P), and the direction of rotation range of the transition screw thread 25 in the rising area, the direction of rotation range of the guide screw thread 23 in the guide thread area 24, and the axial length of the tapered guide portion 230 as described above are set within the range of two pitches.

Figure 7:
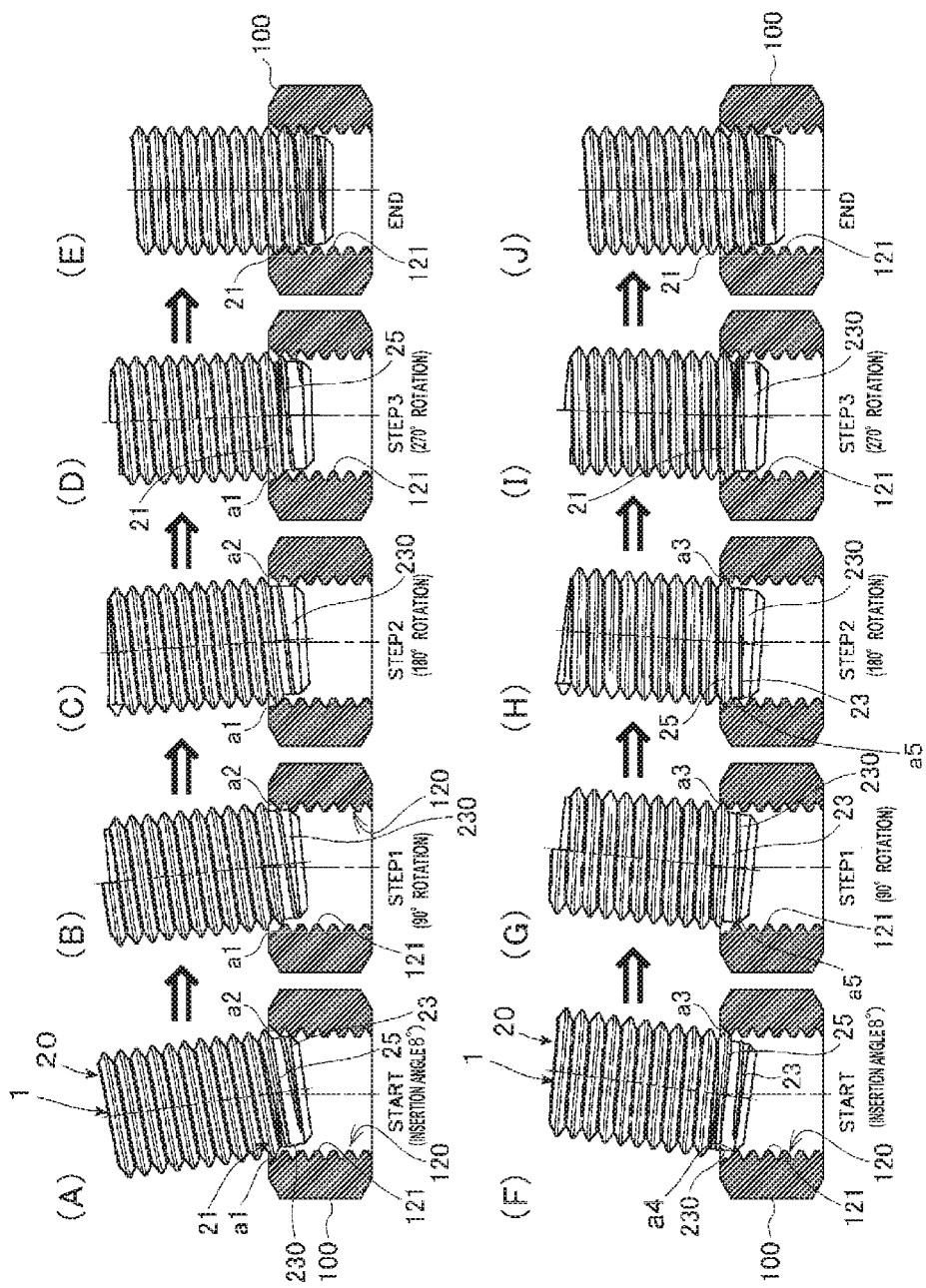

Next, a fastening operation of the male thread member of the second embodiment will be described with reference to FIG. 7. FIG. 7(A) through (E) illustrate cross sections of a state in which the shank portion 20 of the external thread member 1 enters the internal thread member 100 while being inclined in the counterclockwise direction in these figures, and FIG. 7(F) through (J) illustrate cross sections of a state in which the shank portion 20 of the external thread member 1 enters the internal thread member 100 while being inclined in the clockwise direction in these figures. First, the case where the shank portion is inclined in the counterclockwise direction will be described with reference to FIG. 7(A) through (E). FIG. 7(A) illustrates a state in which the shank portion 20 of the external thread member 1 enters the threaded hole 120 of the internal thread member 100 at an angle with respect to the center line of the threaded hole 120, so that the screw thread 121 of the threaded hole 120 is engaged with the screw thread of the external thread member 1 at the opening edge of the threaded hole 101 in an engagement portion a1, and the guide screw thread 23 at the 180 degrees opposite position a2 is engaged with the screw thread 121 of the threaded hole 120 at a position shifted by one thread with respect to the engagement portion a1, that is, engaged in a biting state. When the shank portion 20 of the external thread member 1 is rotated in this state, the diameter of the tapered guide portion 230 increases, as shown in FIGS. 7(B) and (C) (STEP 1 and STEP 2), and in STEP 3 where rotated by 270 degrees, as shown in FIG. 7(D), the guide screw thread 23 at the biting position is naturally disengaged from the screw thread 121 of the internal screw, so that the inclination of the shank portion 20 is corrected by a moment with the engagement portion a1 as a fulcrum, and the complete screw thread 21 is fastened to the screw thread 121 of the internal screw in a normally engaged state, as shown in FIG. 7(E).

Then, the case where the shank portion is inclined in the clockwise direction will be described with reference to FIG. 4(F) through (J). In FIG. 7(F), the shank portion 20 of the external thread member 1 enters at an angle with respect to the central axial line of the threaded hole 120, so that the screw thread 121 of the threaded hole 120 engages, at an engagement portion a3, with the screw thread of the external thread member 1 at the opening edge of the threaded hole 120, and abuts, at the 180 degrees opposite position a4, against the tapered guide portion 230 without the existence of the guide screw thread 23, and hence, the external thread member 1 rotates idly. On the other hand, the shank portion 20 of the external thread member 1 is rotationally driven while the inclination thereof is reduced by a counterclockwise moment with the engagement portion a3 as a fulcrum, so that when the shank portion 20 is rotated by about 90 degrees, the guide screw thread 23 is engaged with the screw thread 121 of the internal screw at an engagement portion a5 (STEP 1), as illustrated in FIG. 7(G). Then, as illustrated in FIG. 7(H), at the time of rotation by about 180 degrees, the engagement portion a5 is disengaged by the tapered guide portion 230 (STEP 2), and further, as illustrated in FIG. 7(I), at the position of rotation by about 270 degrees, a normally engaged state is attained (STEP 3), and as illustrated in FIG. 7(J), at the position of rotation by 360 degrees, the complete screw thread 21 is fastened to the screw thread 121 of the internal screw in a normally engaged state. In the second embodiment, the tolerance of the inclination is smaller than that in the case where there is a cylindrical surface, as in the first embodiment, but the tapered guide portion 230 extends to the rising area 26 of the transition screw thread 25, and hence, there is an advantage in that a backlash upon insertion of the tapered guide portion 230 can be reduced as much as possible. In addition, even in cases where the transition screw thread 25 is obliquely fitted into the screw thread 121 of the internal screw to cause abnormal engagement, a moment acting on the root portion of the transition screw thread 25 will be small because the thread height of the transition screw thread 25 is low. Moreover, the root portion of the transition screw thread 25 is reinforced by the tapered guide portion 230, so that galling and seizure due to breakage of the screw threads can be further prevented.

REFERENCE SIGNS LIST 1 external thread member,
10 head portion,
20 shank portion,
21 complete screw thread,
22 normal thread area,
23 guide screw thread,
24 guide thread area,
25 transition screw thread,
26 rising area,
27 cylindrical surface,
30 tapered guide portion,
30a maximum diameter portion,
30b chamfered portion,
31 tapered portion,
L length from the crest of connecting portion C1 to the tip of shank portion 20,
100 internal thread member,
120 threaded hole,
121 screw thread,
230 tapered guide portion,
230a maximum diameter portion,
230b chamfered portion,
231 tapered portion,
240 cylindrical surface,
C1, C2 connecting portion,
C3 tip,
a1, a3, a4 engagement portion,
d0 root diameter (normal thread area),
d1 outer diameter (maximum diameter of tapered guide portion 30)
d21 outer diameter (maximum diameter of tapered guide portion 230)

The invention claimed is:

1. An external thread member including, in its shank portion, a normal thread area in which a complete screw thread to be fastened to an internal thread member is formed, a guide thread area which is provided on a shank portion tip end side with respect to the normal thread area and in which a guide screw thread having a diameter smaller than that of the complete screw thread and having a same pitch is formed, and a rising area in which a transition screw thread gradually rising from the guide screw thread to the complete screw thread is formed, wherein a tapered guide portion having a diameter that gradually decreases toward a tip end of the shank portion is provided on a tip end side of the normal thread area of the shank portion; the tapered guide portion includes at least the guide thread area; the guide screw thread is formed on an outer periphery of the tapered guide portion; and a maximum diameter of the tapered guide portion is equal to or smaller than an inner diameter of an internal screw and equal to or larger than a root diameter of the complete screw thread.

2. The external thread member according to claim 1, wherein a cylindrical surface having the same diameter as a root diameter of the normal thread area is provided between the tapered guide portion and the normal thread area, and at least a part of the transition screw thread is formed on the cylindrical surface.

3. The external thread member according to claim 2, wherein a diameter of the guide screw thread is set to be equal to or smaller than the inner diameter of the internal screw.

4. The external thread member according to claim 2, wherein the transition screw thread is configured to rise from the guide screw thread to the complete screw thread with ¼-¾ circumference.

5. The external thread member according to claim 2, wherein the tapered guide portion is provided with a chamfered portion in a tip end corner portion thereof at its small diameter side.

6. The external thread member according to claim 2, wherein an axial length from a tip end position of the complete screw thread to a tip end position of the tapered guide portion is set to be within two pitches of the complete screw thread.

7. The external thread member according to claim 2, wherein a maximum diameter of the tapered guide portion is in a range of a lower limit value of the inner diameter of the internal screw×(90%-100%).

8. The external thread member according to claim 1, wherein the tapered guide portion extends to a rising area of the transition screw thread, and the guide screw thread and the transition screw thread are formed on an outer peripheral surface of the tapered guide portion.

9. The external thread member according to claim 8, wherein a diameter of the guide screw thread is set to be equal to or smaller than the inner diameter of the internal screw.

10. The external thread member according to claim 8, wherein the transition screw thread is configured to rise from the guide screw thread to the complete screw thread with ¼-¾ circumference.

11. The external thread member according to claim 8, wherein the tapered guide portion is provided with a chamfered portion in a tip end corner portion thereof at its small diameter side.

12. The external thread member according to claim 8, wherein an axial length from a tip end position of the complete screw thread to a tip end position of the tapered guide portion is set to be within two pitches of the complete screw thread.

13. The external thread member according to claim 8, wherein a maximum diameter of the tapered guide portion is in a range of a lower limit value of the inner diameter of the internal screw×(90%-100%).

14. The external thread member according to claim 1, wherein a diameter of the guide screw thread is set to be equal to or smaller than the inner diameter of the internal screw.

15. The external thread member according to claim 1, wherein the transition screw thread is configured to rise from the guide screw thread to the complete screw thread with ¼-¾ circumference.

16. The external thread member according to claim 1, wherein the tapered guide portion is provided with a chamfered portion in a tip end corner portion thereof at its small diameter side.

17. The external thread member according to claim 1, wherein an axial length from a tip end position of the complete screw thread to a tip end position of the tapered guide portion is set to be within two pitches of the complete screw thread.

18. The external thread member according to claim 1, wherein a maximum diameter of the tapered guide portion is in a range of a lower limit value of the inner diameter of the internal screw×(90%-100%).

\* \* \* \* \*